US010931100B2

(12) United States Patent
Li et al.

(10) Patent No.: US 10,931,100 B2
(45) Date of Patent: Feb. 23, 2021

(54) CURRENT LIMITING CIRCUITS

(71) Applicant: Astec International Limited, Kowloon (HK)

(72) Inventors: Wei Ping Li, Shen Zhen (CN); Wei Jia Yan, Shen Zhen (CN); Wen Jian Liao, Shen Zhen (CN); Xin Zhang, Shen Zhen (CN)

(73) Assignee: Astec International Limited, Kowloon (HK)

( * ) Notice: Subject to any disclaimer, the term of this patent is extended or adjusted under 35 U.S.C. 154(b) by 85 days.

(21) Appl. No.: 16/305,292

(22) PCT Filed: Dec. 26, 2017

(86) PCT No.: PCT/CN2017/118713
§ 371 (c)(1),
(2) Date: Nov. 28, 2018

(87) PCT Pub. No.: WO2019/127037
PCT Pub. Date: Jul. 4, 2019

(65) Prior Publication Data
US 2020/0044439 A1 Feb. 6, 2020

(51) Int. Cl.
*H02H 9/02* (2006.01)
*H02M 3/158* (2006.01)

(52) U.S. Cl.
CPC ............ *H02H 9/025* (2013.01); *H02M 3/158* (2013.01)

(58) Field of Classification Search
CPC .................... H02H 9/025; H02M 3/158
See application file for complete search history.

(56) References Cited

U.S. PATENT DOCUMENTS

| 5,122,724 | A | 6/1992 | Criss | |
|---|---|---|---|---|
| 6,330,143 | B1 * | 12/2001 | Maly | ................. H03K 17/0828 361/101 |
| 2003/0223159 | A1 * | 12/2003 | Jenkins | ................ H02M 3/158 361/18 |
| 2007/0029982 | A1 | 2/2007 | Chen | |
| 2007/0236839 | A1 * | 10/2007 | vanRuymbeke | ..... G01R 22/063 361/18 |
| 2016/0072485 | A1 | 3/2016 | Vice et al. | |

FOREIGN PATENT DOCUMENTS

| CN | 1677819 A | 10/2005 |
|---|---|---|
| CN | 104795989 A | 7/2015 |
| CN | 104980021 A | 10/2015 |

OTHER PUBLICATIONS

Mark Pearson, Current Limiting Key to Hot-Swap Circuit Protection, Sep. 18, 2002 (6 pages).

* cited by examiner

*Primary Examiner* — Dharti H Patel

(57) ABSTRACT

A current limiting circuit for controlling current from a power supply to a load having a capacitance includes an inductor, a transistor coupled in a current path with the inductor, and a control circuit. The transistor includes a control terminal. The control circuit is coupled to sense a voltage across the inductor and coupled to the control terminal of the transistor. The control circuit is configured to turn off the transistor when the voltage across the inductor is greater than a threshold to restrict current from a power supply, and turn on the transistor when a defined parameter is met to allow current from the power supply to charge the load capacitance. Other example current limiting circuits are also disclosed.

21 Claims, 7 Drawing Sheets

CURRENT LIMITING CIRCUITS

FIELD

The present disclosure relates to current limiting circuits.

BACKGROUND

This section provides background information related to the present disclosure which is not necessarily prior art.

A power supply (e.g., a switch-mode power supply) provides electrical power to a load. Sometimes, the load is coupled to an output of the power supply while the power supply is on (e.g., active). This is commonly referred to as hot-plugging or hot-swapping. In such conditions, the load may experience a short-circuit condition which causes the power supply's output current to increase. Sometimes, a current limiting circuit is used to limit the power supply's output current. This current limiting circuit is commonly placed on the load side (e.g., at an input port of a load board, on the output side of a load capacitor, etc.).

For example, FIG. 1 illustrates a prior art system 100 including a power supply and a load 102 hot-plugged into the power supply at a connector. The power supply is represented by a voltage (PS_V). As shown, the load 102 includes a conventional current limiting circuit 104, a load resistor RA3, and a load capacitor CA2. The current limiting circuit 104 includes a sense resistor RA1, a transistor QA1, a capacitor CA1, a resistor RA2 and a metal-oxide-semiconductor field-effect transistor (MOSFET) QA2. When current passing through the sense resistor RA1 reaches a threshold, the transistor QA1 turns on allowing the capacitor CA1 to discharge. In turn, the MOSFET QA2 turns off to prevent current from passing to the load resistor RA3 and the load capacitor CA2.

FIG. 2 illustrates another prior art system 200 including a power supply (voltage PS_V) and a load 202 hot-plugged into the power supply at a connector. The load 202 includes a conventional current limiting circuit 204, a load resistor RB2, and a load capacitor CB2. As show, the current limiting circuit 204 includes a diode DB, a capacitor CB1, a resistor RB1 and a MOSFET QB. When the load 202 is hot-plugged into the power supply, the capacitor CB1 is not charged and the MOSFET QB is off. When current begins to flow, the capacitor CB1 charges causing a gate-source voltage of the MOSFET QB to increase. As a result, the MOSFET QB turns on. The conventional current limiting circuit 204 is active only during power-up conditions and when the capacitor CB1 is not charged.

SUMMARY

This section provides a general summary of the disclosure, and is not a comprehensive disclosure of its full scope or all of its features.

According to one aspect of the present disclosure, a current limiting circuit for controlling current from a power supply to a load having a capacitance is disclosed. The current limiting circuit includes an inductor, a transistor coupled in a current path with the inductor, and a control circuit. The transistor includes a control terminal. The control circuit is coupled to sense a voltage across the inductor and coupled to the control terminal of the transistor. The control circuit is configured to turn off the transistor when the voltage across the inductor is greater than a threshold to restrict current from a power supply, and turn on the transistor when a defined parameter is met to allow current from the power supply to charge the load capacitance. Other example current limiting circuits are also disclosed.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or features throughout the several views of the drawings.

DETAILED DESCRIPTION

Figure 1:
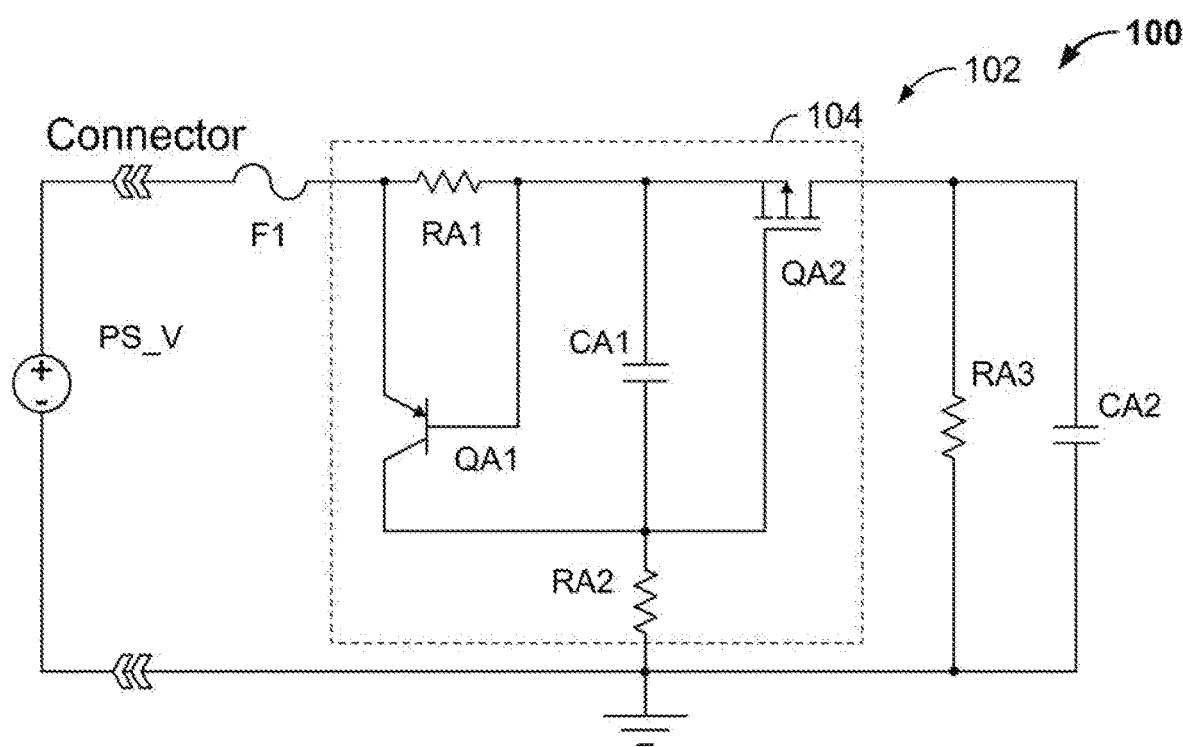
FIG. 1 illustrates a hot plug-in circuit including a sense resistor according to the prior art.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
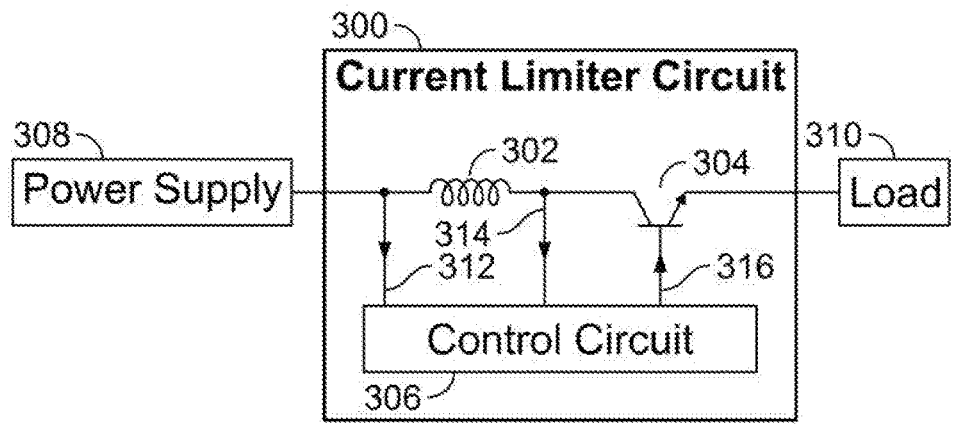
FIG. 3 is a block schematic diagram of a current limiting circuit having an inductor and a transistor coupled in a current path with the inductor according to one example embodiment of the present disclosure.

A current limiting circuit for controlling current from a power supply to a load having a capacitance according to one example embodiment of the present disclosure is illustrated in FIG. 3 and indicated generally by reference number 300. As shown in FIG. 3, the current limiting circuit 300 includes an inductor 302, a transistor 304 coupled in a current path with the inductor 302 and including a control terminal. The current limiting circuit 300 also includes a control circuit 306 coupled to sense a voltage across the inductor 302 and coupled to the control terminal of the transistor 304. The control circuit 306 is configured to turn off the transistor 304 when the voltage across the inductor 302 is greater than a threshold to restrict current from a power supply, and turn on the transistor 304 when a defined parameter is met to allow current from the power supply to charge the load capacitance.

For example, current flowing through the power supply 308 and/or the load 310 may increase due to different conditions such as overcurrent conditions, short-circuit conditions (e.g., hot-plugging the load 310 into the power supply 308), etc. For instance, when the load 310 (e.g., a system board) is hot-plugged into the power supply 308, the load 310 is short circuited by the capacitance if the capacitance is not fully charged. The short-circuit condition causes the output current (e.g., the current passing through the inductor 302 and the transistor 304) of the power supply 308 to increase. This increased current may be harmful to components in the current limiting circuit 300, the power supply 308 and/or the load 310. However, by sensing the voltage across the inductor 302 and then controlling the transistor 304 accordingly (as explained herein), a drastic increase in current may be substantially prevented.

For instance, a voltage across the inductor 302 is induced when current flowing through the inductor 302 changes (e.g., increases). Conversely, a voltage is not induced across the inductor 302 when current flowing through the inductor 302 is substantially constant (e.g., zero). Thus, a voltage sensed across the inductor 302 may indicate an increase in current flowing through the inductor 302 (and to the load 310). In response, the control circuit 306 may control the transistor 304 (via a control signal 316 provided to the transistor's control terminal) accordingly to prevent the increased current from damaging components in the current limiting circuit 300, the power supply 308 and/or the load 310. For example, an increased current in the power supply 308 due to, for example, hot-plugging the load 310 may be detected by monitoring the voltage across the inductor 302, and mitigated by controlling the transistor 304 to turn off. After the transistor 304 is turn off, the current flowing through the inductor 302 falls to zero. This causes the voltage across the inductor 302 to fall to zero, as explained above.

The threshold used to determine when to turn off the transistor 304 may be any suitable value. For example, the threshold may be 0V or a value more or less than 0V. In some examples, it may be desirable to detect any increase in current in the power supply 308 and/or the load 310. In such examples, the threshold may be 0V.

Alternatively, this threshold may be a value greater than zero if some increase in current is tolerable in the power supply, load, etc. and/or if the current flowing through the inductor 302 is not constant. For example, in some embodiments, this threshold may depend on one or more components in the control circuit 306. As further explained below, the control circuit 306 may include a switching device (e.g., a transistor, MOSFET, etc.) for controlling the transistor 304. For instance, if the control switching device is a BJT, the threshold used to determine when to turn off the transistor 304 may be about 0.7 volts (e.g., the gate voltage to turn on the BJT). In other examples, the control switching device may be a P-channel MOSFET or an N-channel MOSFET. In such examples, the threshold used to determine when to turn off the transistor 304 may be between about −1V and about −3V or between about 1V and about 3V, respectively.

The transistor 304 may turn on again to allow current from the power supply 308 to charge the load's capacitance when the defined parameter is met. The defined parameter used to determine when the transistor 304 turns on again may include one or more different parameters. In some examples, the defined parameter is a defined period of time, and the control circuit 306 may control the transistor 304 to turn on when the defined period of time has elapsed. In such examples, the control circuit 306 may include a clock, counter, etc. that starts after the transistor 304 turns off. In some examples, the period of time may be about 6 milliseconds, or a value more or less than 6 milliseconds.

Alternatively, the control circuit 306 may control the transistor 304 to turn on when the voltage across the inductor 302 is less than or equal to a threshold. For example, this threshold may be (or about) 0V or a value larger than 0V. For example, the transistor 304 may turn on when the inductor's voltage falls to zero and/or at some point before the inductor's voltage falls to zero (e.g., a value greater than zero). In other embodiments, this threshold may depend on one or more components in the control circuit 306, as explained above.

In other examples, the control circuit 306 may control the transistor 304 to turn on when the voltage across the inductor 302 is less than or equal to a threshold and when a defined period of time has elapsed.

In some examples, the control circuit 306 may control the transistor 304 to allow a defined amount of current to output from the power supply 308 to charge the load's capacitance. In such examples, a voltage across the load's capacitance may slowly ramp up instead of abruptly increasing which may cause current drain on the power supply's output. This defined amount of current may be lower than the load's current demand. After the capacitance is charged, the power supply 308 may provide the load's current demand.

The defined amount of current provided to the load 310 when the capacitance is charging may vary (e.g., increase) over time, or may be fixed (at least for a period of time). For example, the transistor 304 may function as a variable resistance causing the current passing through the transistor 304 to change as desired.

In the particular example of FIG. 3, the control circuit 306 senses the voltage across the inductor 302 by employing two voltage sensors, one on each side of the inductor 302. This is shown by control circuit inputs 312, 314. Alternatively, one or more other suitable sensing devices may be employed if desired.

In the particular example of FIG. 3, the transistor 304 is a bipolar junction transistor (BJT). Alternatively, and as further explained below, the transistor 304 may be a field-effect transistor (FET) (e.g., a MOSFET, an ORing MOSFET, etc.) and/or another suitable transistor.

As shown in FIG. 3, the current limiting circuit 300 is positioned between the output of the power supply 308 and the input of the load 310. In other examples, the current limiting circuit 300 and/or other current limiting circuits disclosed herein may be at least a part of the power supply 308 and/or the load 310. For instance, the current limiting circuit 300 may be entirely or partially within the power supply 308, entirely or partially within the load 308, etc.

Figure 4:
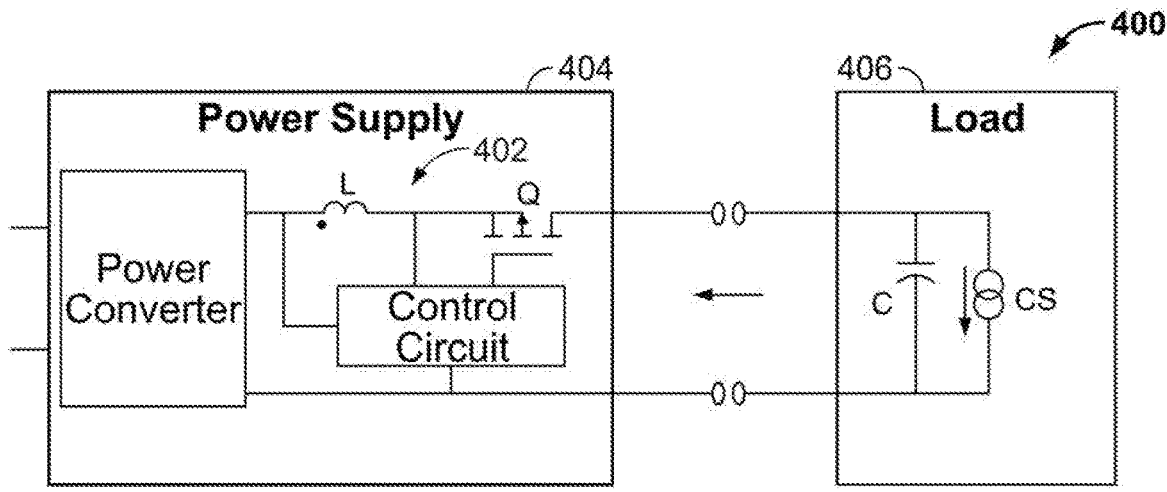
FIG. 4 is a block schematic diagram of a power supply including a current limiting circuit according to another example embodiment.
Figure 5:
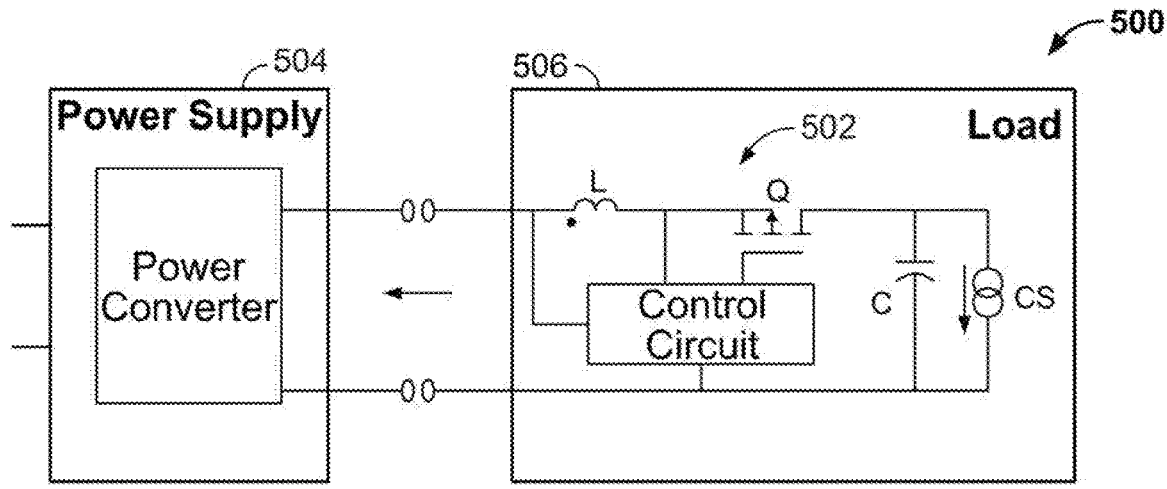
FIG. 5 is a block schematic diagram of a load including a current limiting circuit according to yet another example embodiment.

For example, FIGS. 4 and 5 illustrate systems 400, 500 each including a current limiting circuit 402, 502 positioned within a power supply or a load. Specifically, the systems 400, 500 each include a power supply 404, 504 and a load 406, 506 for coupling to (e.g., hot-plugging into) the power supply 404, 504. As shown, the loads 406, 506 are represented by a current sink CS having a max load current of about 2 A, and include a capacitance component C.

The current limiting circuits 402, 502 may be substantially similar to the current limiting circuit 300. As such, the current limiting circuits 402, 502 each may include an inductor L, a transistor Q (e.g., a MOSFET), and a control circuit, as explained above.

As shown in FIG. 4, the current limiting circuit 402 is positioned in the power supply 404. Specifically, the current limiting circuit 402 is coupled between the power supply's power converter and the power supply's output. Thus, in the example of FIG. 4, the current limiting circuit 402 is coupled to the capacitance C in the load 406.

As shown in FIG. 5, the current limiting circuit 402 is positioned in the load 506. Specifically, the current limiting circuit 402 is coupled on an input side of the load's capacitance C.

In some examples, the inductor L and/or the capacitance C may be filter components. For example, the inductor L in the current limiting circuit 402 may be used as a component in an output filter, the inductor L in the current limiting circuit 502 may be used as a component in an input filter, and/or the capacitance C may be used as a component in an input filter.

Figure 6A:
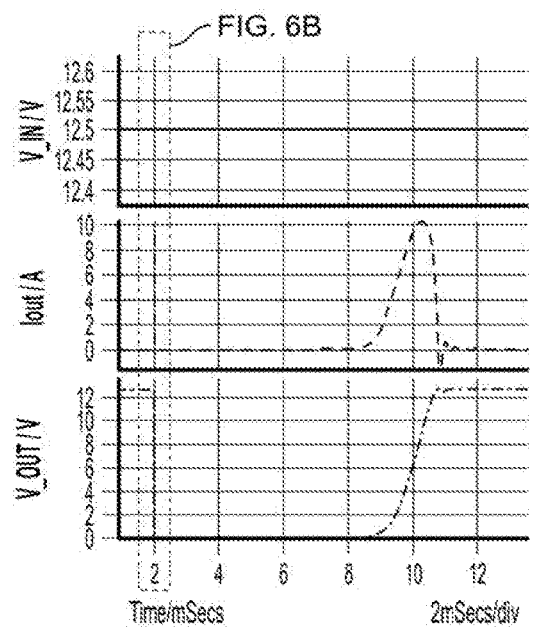
FIG. 6A is a graph of voltage and current waveforms of the power supply of FIG. 4 according to another example embodiment.
Figure 6B:
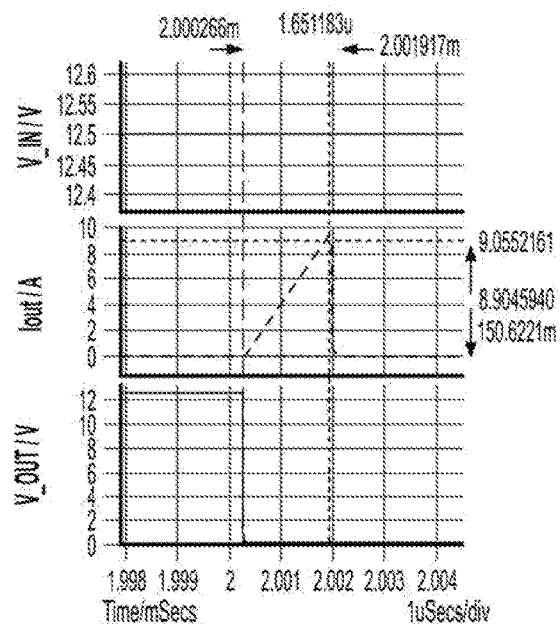
FIG. 6B is an enlarged view of the dashed rectangular portion of FIG. 6A.

FIGS. 6A and 6B illustrate example voltage and current waveforms of the power supply 404 of FIG. 4 when the load 406 is hot-plugged into the power supply 404. The waveforms represent an input voltage (V_IN) of the current limiting circuit 402, an output voltage (V_OUT) of the power supply 404, and an output current (I_OUT) of the power supply 404. In this particular example, the power converter is designed to provide a 12.5V regulated output to the current limiting circuit 402.

As shown in FIGS. 6A and 6B, the load 406 is hot-plugged into the power supply 404 at about the two millisecond mark. This causes the output current (I_OUT) to increase almost immediately (e.g., 0.000266 msec after the load is hot-plugged into the power supply 404) from 0 A due to an inrush of current required to charge the capacitance C in the load 406. This increasing output current flows through the inductor L causing an induced voltage across the inductor L as explained above. Soon thereafter, the MOSFET Q of FIG. 4 turns off to restrict the output current. For example, and as shown in FIG. 6B, the MOSFET Q turns off at about 0.001917 msec after the load is hot-plugged into the power supply 404. At this point, the output current (I_OUT) reaches a peak of about 9 A. After the MOSFET Q turns off, the output current (I_OUT) and the output voltage (V_OUT) fall to zero.

The MOSFET Q turns back on when a defined parameter is met as explained above. In this particular example, the MOSFET Q turns back on about six milliseconds after the MOSFET Q is shut off (e.g., at about the eight millisecond mark). As shown in FIG. 6A, once the MOSFET Q turns back on, the output current (I_OUT) gradually increases to about 10 A thereby ensuring a slow increase in the voltage across the load's capacitance C, as explained above. During this time, the output voltage (V_OUT) increases back to 12.5V.

Figure 2:
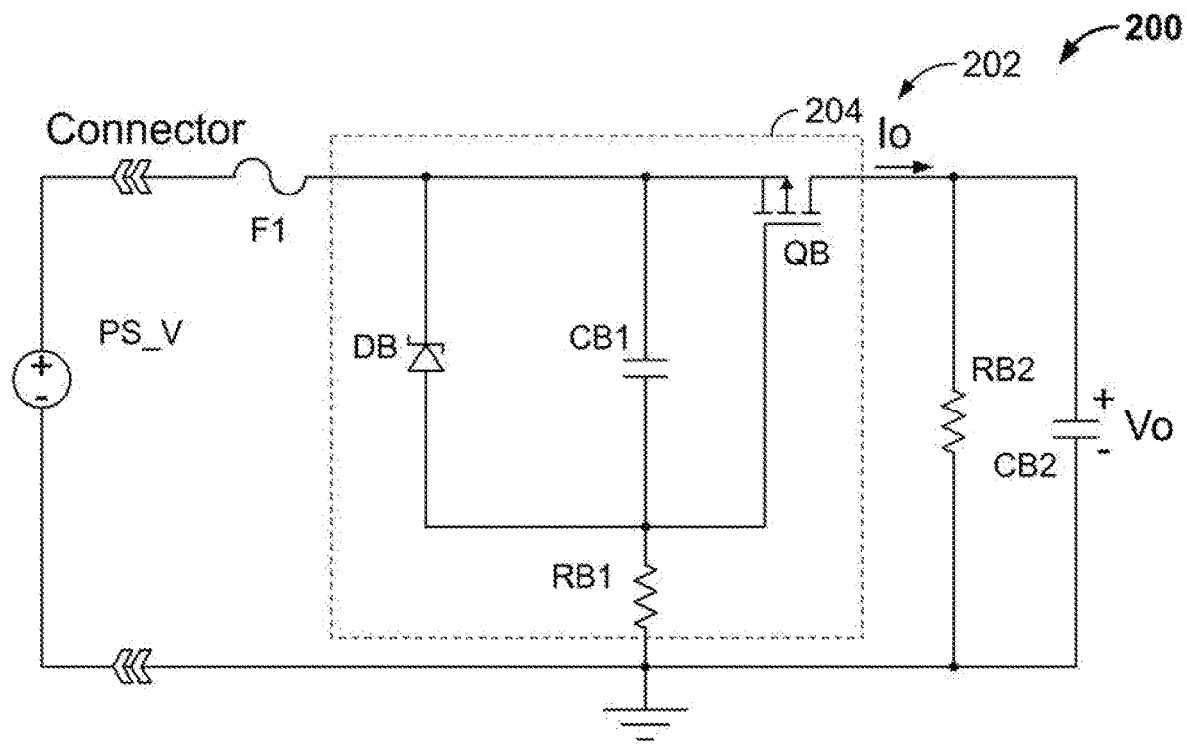
FIG. 2 illustrates another hot plug-in circuit according to the prior art.
Figure 7A:
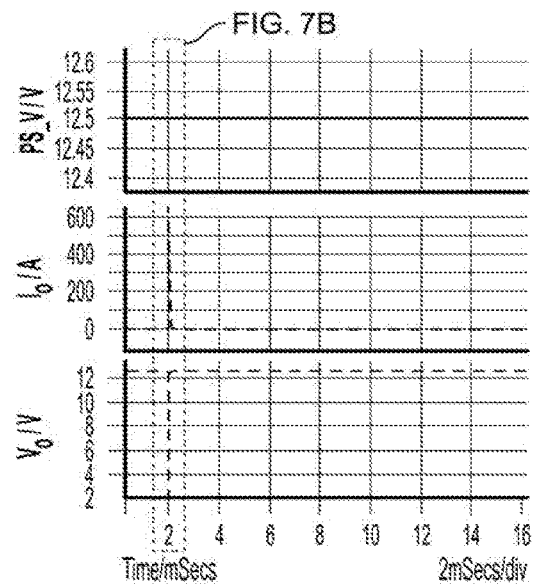
FIG. 7A is a graph of voltage and current waveforms of the prior art system of FIG. 2.
Figure 7B:
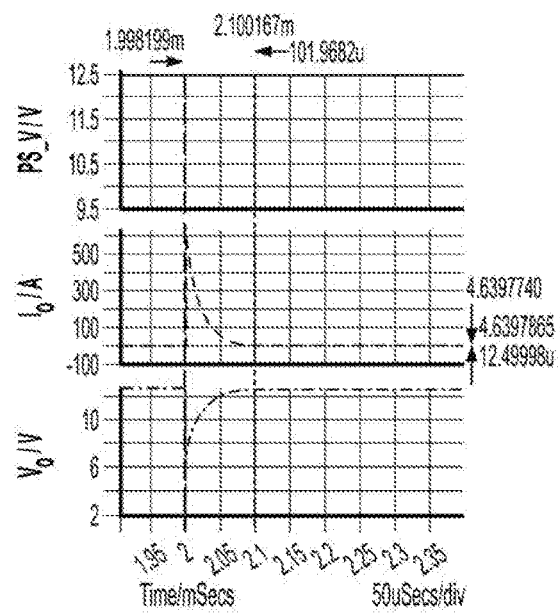
FIG. 7B is an enlarged view of the dashed rectangular portion of FIG. 7A.

In contrast, FIGS. 7A and 7B illustrate example voltage and current waveforms of the prior art system 200 of FIG. 2. The waveforms represent the power supply's output voltage (PS_V) provided to the load 202, a voltage (Vo) across the capacitor C2, and an output current (Io) as shown in FIG. 2. The power supply 200 is designed to provide a 12.5V regulated output.

As shown, when the load 202 is hot-plugged into the power supply 202 at the two millisecond mark, the output current (Io) surges to a peak of over 600 A to charge the capacitor C2. During this time, the voltage across the capacitor C2 drops to zero signifying a short-circuit condition. Thus, although the load 202 may have a max load current of about 2 A, the output current (Io) surges to over 600 A. This large amount of inrush current may damage components in the power supply 202 and/or the load 202.

Figure 8:
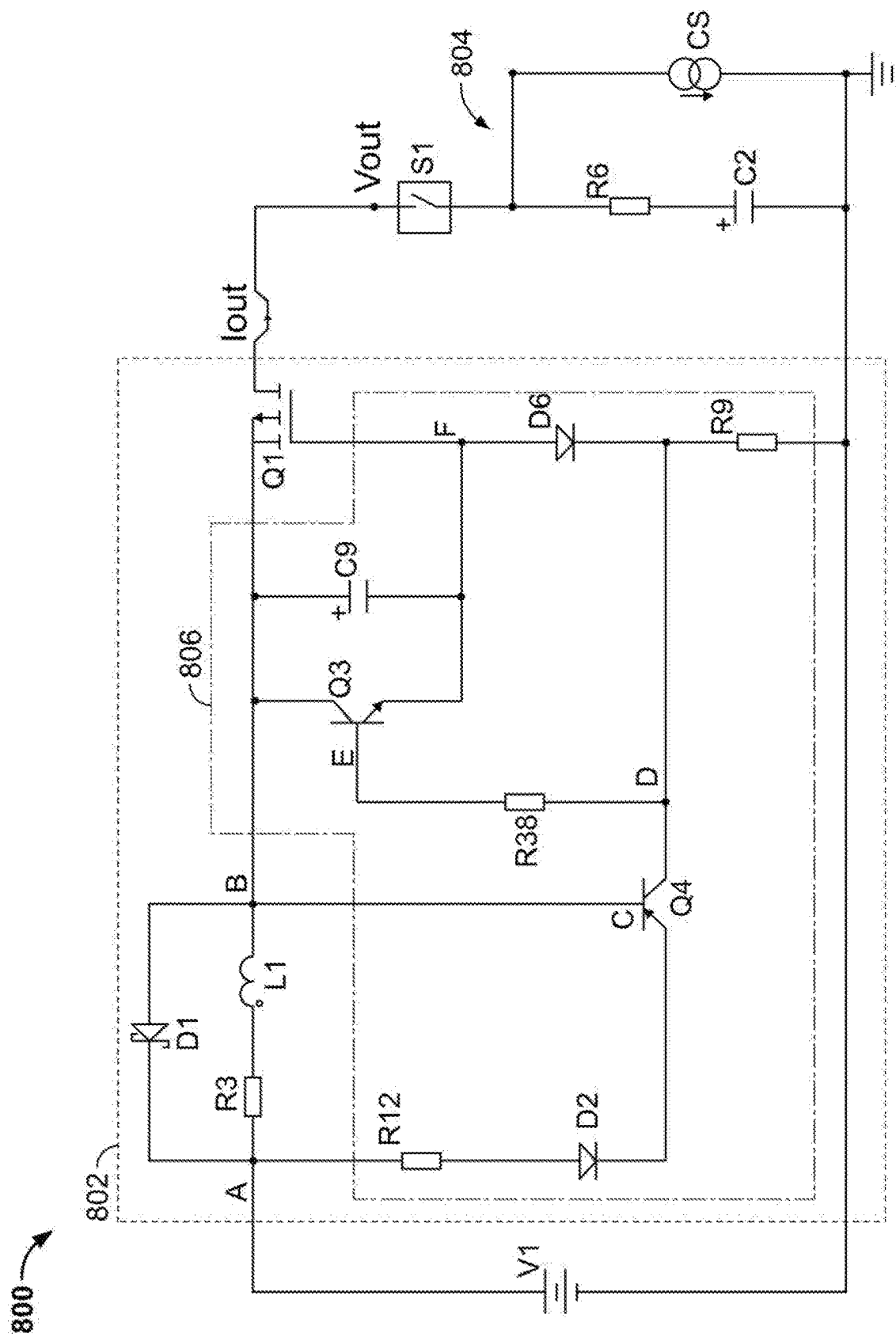
FIG. 8 is an electrical schematic of a power supply including a current limiting circuit having an inductor, a MOSFET coupled in a current path with the inductor, and an analog control circuit for controlling the transistor according to yet another example embodiment.

FIG. 8 illustrates a power supply 800 for powering a load 804. As shown, the power supply 800 includes a current limiting circuit 802 coupled to the load 804. In some examples, the load 804 may have a max load current of about 2 A. In this particular example, a switch S1 is coupled between the current limiting circuit 802 and the load 804 to represent the load 804 being hot-plugged into the power supply 800.

As shown in FIG. 8, the current limiting circuit 802 includes an inductor L1, a resistor R3 representing the DC resistance (DCR) of the inductor L1, a MOSFET Q1 coupled in a current path with the inductor L1, and a control circuit 806 for controlling the MOSFET Q1. In the particular example of FIG. 8, the current limiting circuit 802 receives an input (V1) of 12.5V. The load 804 includes a capacitor C2, a resistor R6 representing the equivalent series resistance (ESR) of the capacitor C2, and a current sink CS. In the particular example of FIG. 8, the inductor L1 functions as an output filter for the power supply 800, and the capacitor C2 functions as an input filter for the load 804.

As shown in FIG. 8, the MOSFET Q1 is coupled between the inductor L1 and the load 804. In other embodiments, the MOSFET Q1 may be coupled on the input side of the inductor L1 such that the inductor is coupled between the MOSFET Q1 and the load 804.

As further explained below, the current limiting circuit 802 functions substantially similar to the other control circuits disclosed herein. For example, the control circuit 806 senses a voltage across the inductor L1, controls the MOSFET Q1 to turn off when the voltage across the inductor L1 is greater than a threshold to restrict current from the power supply 800, and controls the MOSFET Q1 to turn on when a defined parameter is met to allow current from the power supply 800 to charge the capacitor C2 in the load 804.

The control circuit 806 includes various discrete components for controlling the MOSFET Q1. Specifically, the control circuit 806 includes resistors R9, R12, R38, diodes D2, D6, transistors Q3, Q4, and a capacitor C9. In the specific example of FIG. 8, the transistor Q3 is a PNP BJT transistor and the transistor Q4 is a NPN BJT transistor.

As shown in FIG. 8, the resistor R12, the diode D2, and the transistor Q3 form a voltage sensor to sense the voltage across the inductor L1. Specifically, the resistor R12 is coupled between an input side of the inductor L1 and an anode of the diode D2. The resistor R12 limits the peak current seen by the transistors Q3, Q4. The transistor Q4 includes a base terminal, a collector terminal and an emitter terminal. The base terminal is coupled to an output side of the inductor and the emitter terminal is coupled to a cathode of the diode D2.

In some embodiments, the control circuit 806 may not include the diode D2, or the diode D2 may be replaced with a zener diode. For example, if the base-emitter voltage Vbe (e.g., about 0.6V) of the transistor Q4 and the forward voltage Vf (e.g., 0.7V) of the diode D2 is greater than an output voltage regulation range, the diode D2 may be removed, or replaced with a zener diode.

The transistor Q3 includes a base terminal, a collector terminal and an emitter terminal. The base terminal is coupled to the collector terminal of the transistor Q3 via the resistor R38. This resistor limits the peak base-emitter current (Ibe) of the transistor Q3. The collector terminal is coupled to the output side of the inductor L1, one side of the capacitor C9, and a source terminal of the MOSFET Q1. The emitter terminal is coupled to the other side of the capacitor C9, an anode of the diode D6, and a gate terminal of the MOSFET Q1. The capacitor C9, the collector/emitter terminals of the transistor Q4, and the source/gate terminals of the MOSFET Q1 are coupled in parallel. A cathode of the diode D6 is coupled to a reference voltage (e.g., ground), and a drain terminal of the MOSFET Q1 is coupled to the load.

Figure 9A:
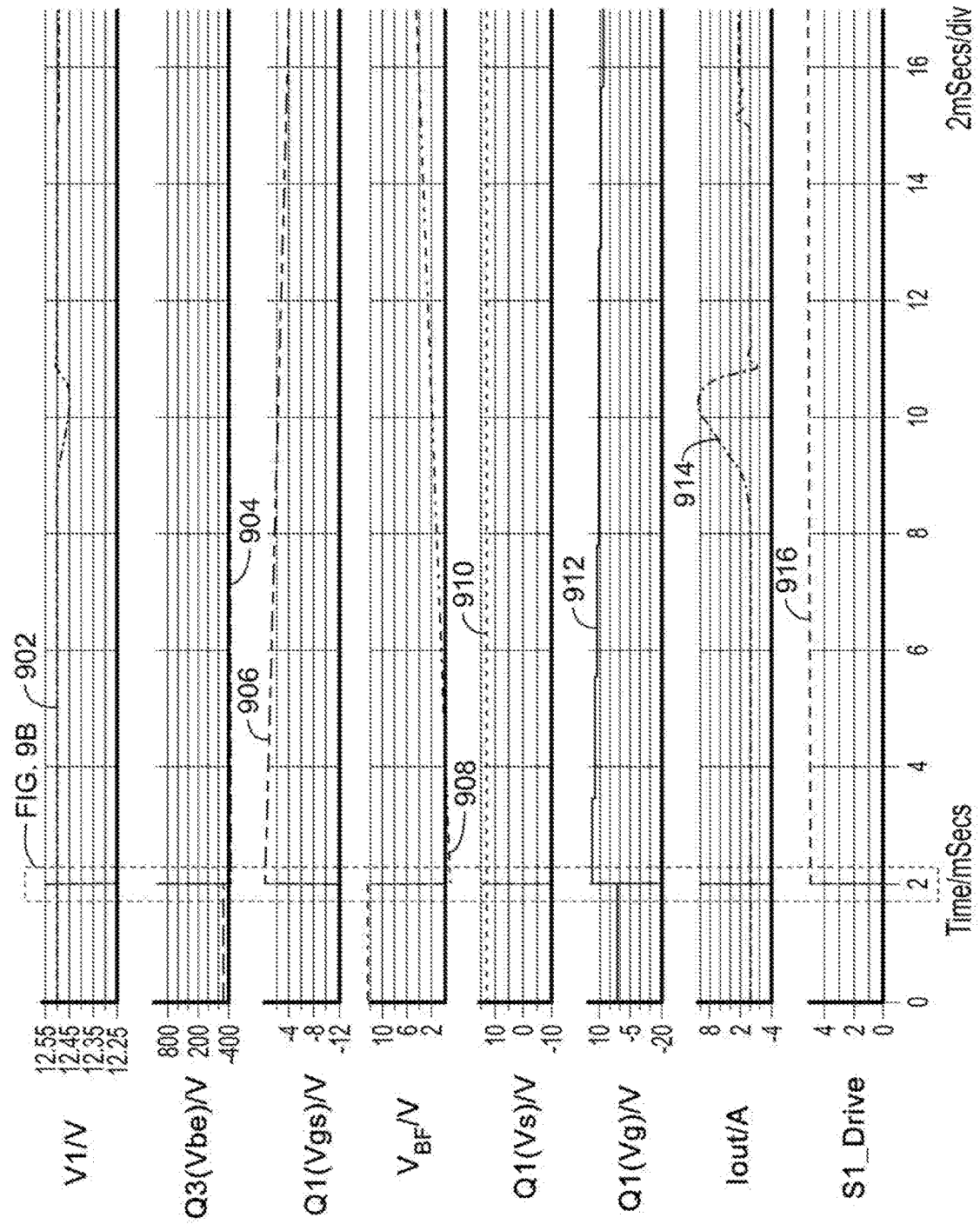
FIG. 9A is a graph of voltage and current waveforms of the power supply of FIG. 8 according to another example embodiment.
Figure 9B:
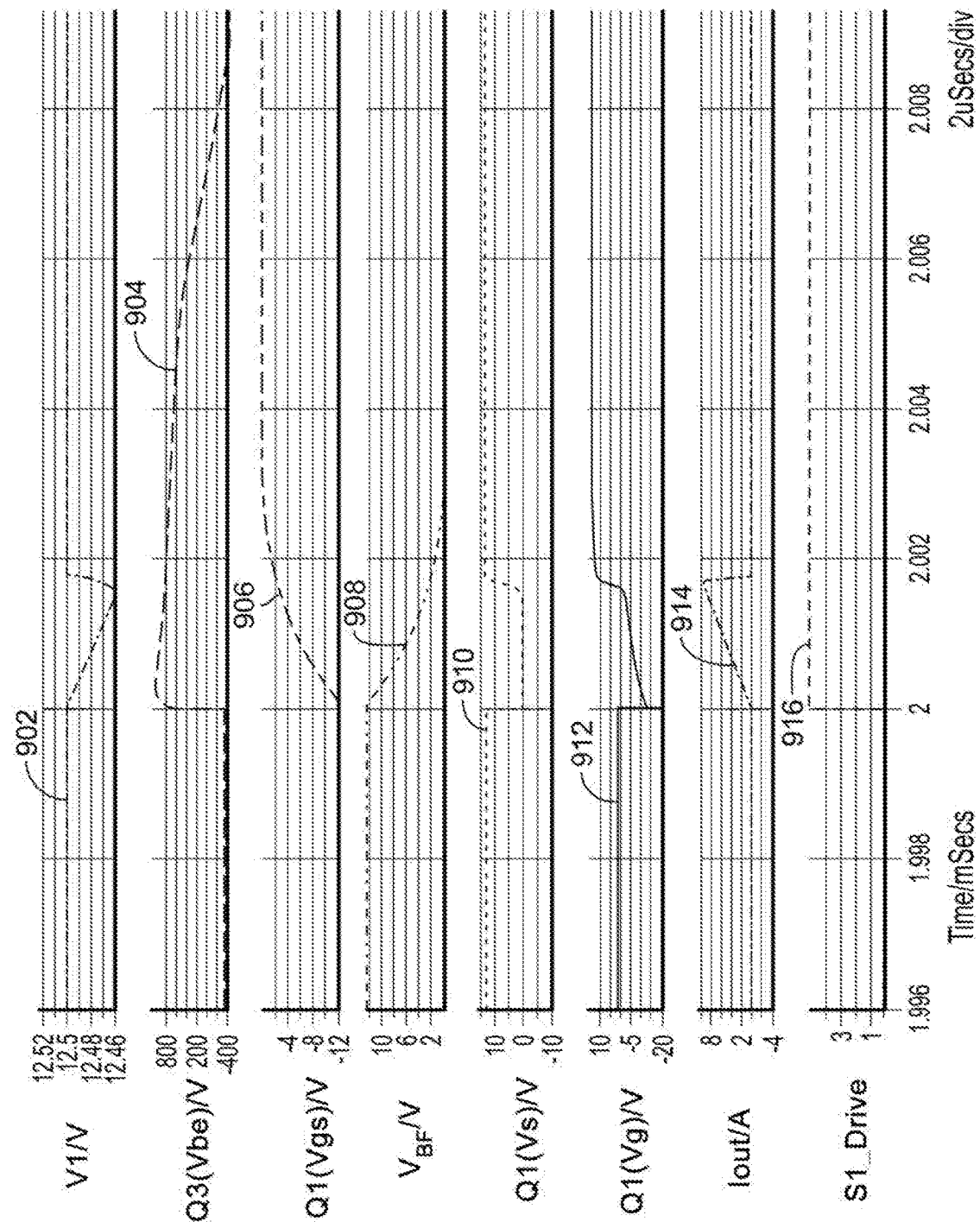
FIG. 9B is an enlarged view of the dashed rectangular portion of FIG. 9A.

FIGS. 9A and 9B illustrates various waveforms of voltages, a drive signal, and current of the power supply 800. Specifically, the waveform 902 represents the current limiting circuit's input voltage V1, the waveform 904 represents the base-emitter voltage (Vbe) of the transistor Q3, the waveform 906 represents the gate-source voltage (Vgs) of the MOSFET Q1, the waveform 908 represents the voltage across terminals B, F ($V_{BF}$) of the current limiting circuit 802, the waveform 910 represents the source voltage (Vs) of the MOSFET Q1, the waveform 912 represents the gate voltage (Vg) of the MOSFET Q1, the waveform 914 represents the output current (Iout) provided to the load 804, and the waveform 916 represents the drive signal for the hot-plug switch S1.

As shown in FIGS. 9A and 9B, the hot-plug switch S1 is turned on at about the two millisecond mark while the MOSFET Q1 is on. This represents the load 804 being hot-plugged into the power supply 800, which provides an output voltage (Vout) of 12.5V. At this time, the output of the power supply 800 experiences a short-circuit condition. For example, the inrush current flows and increases through the inductor L1 to charge the capacitor C2, and the output voltage (Vout) and the voltage at terminal B drops from about 12.5V to 0V. Because the voltage of the capacitor C9 cannot discharge immediately, the voltage at terminal F drops from 0V to −12.5V.

As the current increases through the inductor L1, a voltage across the inductor is induced (as explained above). This induced voltage (the voltage across terminals A, B of FIG. 8) pulls the base voltage of the transistor Q4 below the emitter voltage of the transistor Q4 causing the transistor Q4 to turn on. As a result of the transistor Q4 turning on, the voltage at terminal D of FIG. 8 rises from 0V to 12.5V causing the voltage across terminals E, F (e.g., the base-emitter voltage (Vbe) of the transistor Q3) to rise as shown in FIGS. 9A and 9B. This increase in the base-emitter voltage (Vbe) causes the transistor Q3 to turn on, which allows the voltage of the capacitor C9 to discharge from −12.5V to 0V. As such, the voltage level at the terminals B, F is equal to 0V. This causes the MOSFET Q1 to turn off thereby quickly restricting the output current (Iout) from passing from the power supply 800 to the load 804. For example, and as shown in FIG. 9B, the output current (Iout) reaches a peak of about 9 A before falling back to 0 A in less than 0.002 milliseconds.

After the current through the inductor L1 drops to 0 A, the induced voltage across the inductor L1 drops to 0V as explained above. This causes the transistors Q3, Q4 to turn off. At this time, current begins flows through the inductor L1, the capacitor C9, the diode D6, and the resistor R9 causing the capacitor C9 to charge. As the capacitor C9 charges, the voltage at the terminals B, F of FIG. 8 rises to 12.5V. The charge ramp up rate of the capacitor C9 depends on the values of the capacitor C9 and the resistor R9. In some embodiments, the capacitor C9 may be a 330 nF capacitor and the resistor R9 may be a 100 kohm resistor. Alternatively, other suitable capacitors and/or resistors may be employed based on the desired charge ramp up rate.

As current is flowing (and increasing) through the inductor L1 to charge the capacitor C9, the voltage across the terminals A, B (e.g., across the inductor L1) increases and the voltage at the terminal F (e.g., the gate voltage of the MOSFET Q1) decreases. Once the voltage across the terminals A, B increases to the gate threshold of the MOSFET Q1, the MOSFET Q1 starts conducting and the load capacitor C2 begins to charge.

At this time, the MOSFET Q1 may conduct like a variable resistor. For example, the voltage level across the MOSFET Q1 (e.g., the source-drain voltage) may not be high enough to make the MOSFET Q1 fully conduct. Therefore, the MOSFET Q1 may operate in its saturation region thereby limiting the amount of current provided to the load capacitor C2. As such, the charge rate of the load capacitor C2 may be controlled. The amount of current provided to the load capacitor C2 (and therefore the charge rate of the capacitor C2) may be controlled and adjusted based on the capacitor C9 and the resistor R9. Generally, higher values of the capacitor C9 and the resistor R9 cause a lower amount of charge current. This allows the voltage of the load capacitor C2 (and the power supply's output voltage (Vout)) to ramp up slowly to 12.5V based on the controlled charge current.

At some later point in time, the voltage of the capacitor C9 charges above the MOSFET's on threshold. At this time, the MOSFET Q1 may operate in its triode region.

In some embodiments, the current limiting circuit 802 may include an optional clamping circuit to protect components in the circuit. For example, the current limiting circuit 802 of FIG. 8 includes a clamping circuit coupled to clamp a voltage across the inductor L1 when the MOSFET Q1 is off. Specifically, the clamping circuit includes a diode D1 (e.g., a zener diode). The diode D1 clamps the reverse voltage of the inductor L1 to protect components (e.g., the transistor Q4) in the current limiting circuit 802.

The current limiting circuit transistors disclosed herein may include any suitable transistor. For example, the transistors may include a BJT transistor, a FET (e.g., a MOSFET), etc. The BJT transistor may be a PNP transistor or a NPN transistor, and the MOSFET may be a P-channel MOSFET or an N-channel MOSFET. For example, the MOSFET Q1 of FIG. 8 is shown as a P-channel MOSFET. Alternatively, an N-channel MOSFET, or another suitable transistor may be employed if desired.

Figure 10:
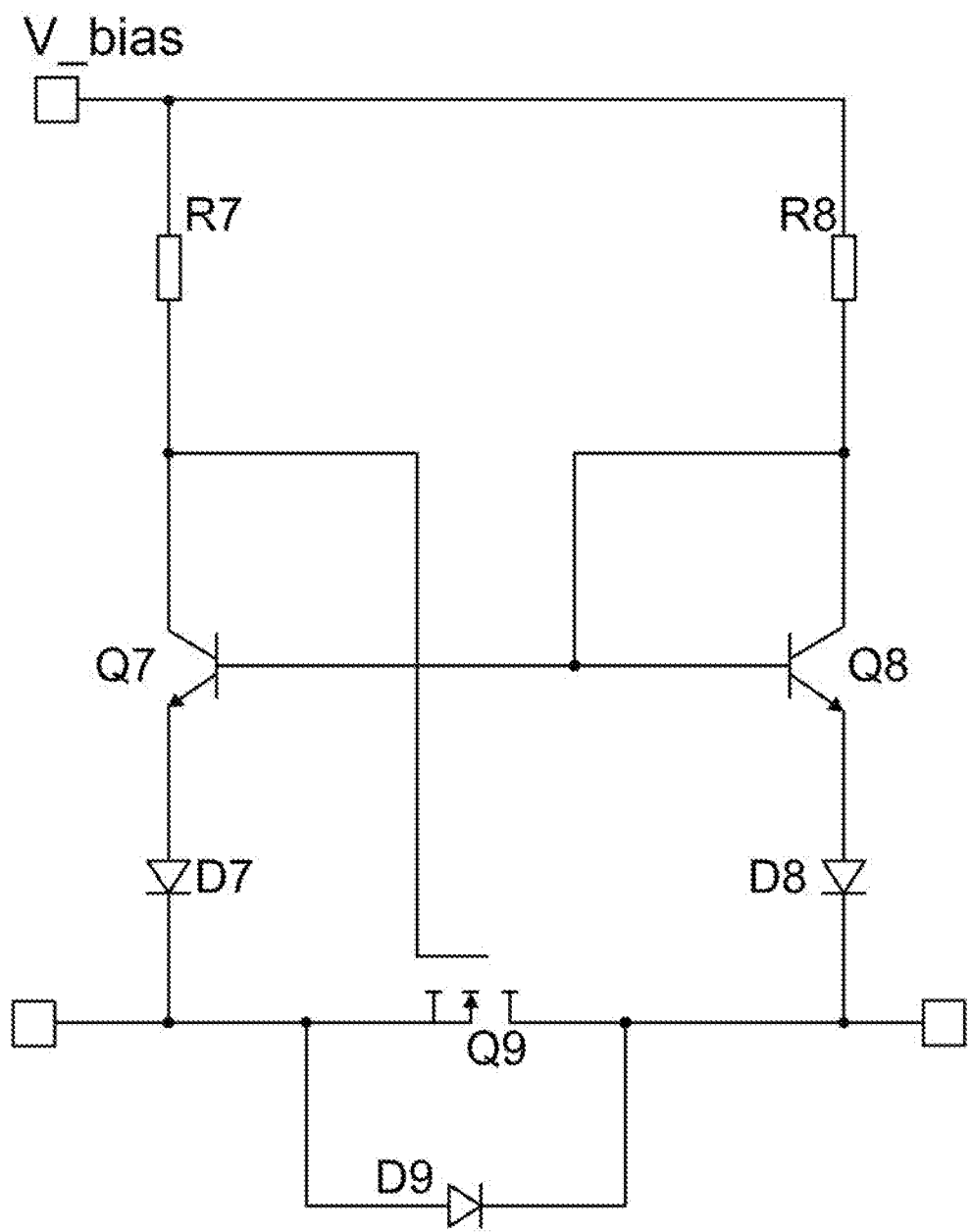
FIG. 10 is an electrical schematic of an ORing MOSFET for use in a current limiting circuit according to yet another example embodiment.

In some embodiments, the current limiting circuit transistor may be a FET including an ORing controller. In such embodiments, the transistor may be considered an ORing FET. For instance, the current limiting circuit 802 of FIG. 8 (and/or any one of the other current limiting circuits disclosed herein) may include an ORing FET. For example, FIG. 10 illustrates a MOSFET Q9 that may replace the FET Q1 of FIG. 8. In this particular example, the MOSFET Q9 is controlled with an ORing controller including resistors R7, R8, diodes D7, D8, and transistors Q7, Q8 coupled between the resistors R7, R8 and the diodes D7, D8. As shown in FIG. 10, the resistors R7, R8 are coupled to a terminal V_bias. If, for example, the MOSFET Q1 of FIG. 8 is replaced with the ORing MOSFET Q9 of FIG. 10, the terminal V_bias may be coupled to the terminal F of FIG. 8.

The current limiting circuits disclosed herein may be employed in and/or with various different power supplies including switch-mode power supplies (SMPS). For example, any one of the current limiting circuits may be employed in a DC/DC SMPS, an AC/DC SMPS, etc. In some preferred embodiments, the current limiting circuits are used in low power applications (e.g., 10 W applications, 20 W applications, etc.). In other embodiments, the current limiting circuits may be used in mid and high power applications (e.g., 100 W applications, etc.).

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). For example, the control circuit 806 of FIG. 8 is an analog control circuit. In other examples, a digital control circuit may be used instead of or in combination with the control circuit 806. Additionally, the entire control circuit, some of the control circuit, or none of the control circuit may be positioned on an integrated circuit. Further, any one of the control circuits may be a portion of another control circuit (e.g., a portion of the power supply's control circuit), or may be a distinct control circuit.

The load capacitances disclosed herein may include one or more real components (e.g., one or more capacitors) and/or one or more parasitic components.

As explained herein, the current limiting circuits may protect components during overcurrent conditions and/or short-circuit conditions (e.g., hot-plugging a load into a power supply). The current limiting circuits may also prevent the power supply from triggering its overcurrent protection process when load(s) are hot-plugged into the power supply.

Additionally, and as explained above, an increased current in the power supplies are detected by using an inductor. As such, the current limiting circuits disclosed herein do not require a current sense resistor which may otherwise dissipate power. Therefore, the current limiting circuits may experience less power loss (e.g., heat dissipation, etc.), higher efficiency, etc. as compared to other circuits using a resistor to sense current.

Further, because the peak output current experienced when load(s) are hot-plugged into the power supply may be limited to about 10 A (and sometimes more or less depending on the selected components), 15 A current rating transistors (e.g. MOSFETs) may be employed as opposed to commonly used 70 A (or higher) current rating transistors. This may substantially reduce costs of the current limiting circuits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A current limiting circuit for controlling current from a power supply to a load having a capacitance, the current limiting circuit comprising:
    an inductor;
    a transistor coupled in a current path with the inductor, the transistor having a control terminal; and
    a control circuit coupled to sense a voltage across the inductor and coupled to the control terminal of the transistor, the control circuit having one or more control switching devices configured to control the transistor including turning off the transistor when the voltage across the inductor is greater than a threshold to restrict current from a power supply, and turning on the transistor when a defined parameter is met to allow current from the power supply to charge the load capacitance.

2. The current limiting circuit of claim 1 wherein the transistor includes a metal-oxide-semiconductor field-effect transistor (MOSFET).

3. The current limiting circuit of claim 1 wherein the voltage across the inductor falls to zero after the transistor turns off.

4. The current limiting circuit of claim 1 wherein the current limiting circuit does not include a current sense resistor.

5. The current limiting circuit of claim 1 further comprising a clamping circuit configured to clamp a voltage across the inductor when the transistor is off.

6. The current limiting circuit of claim 5 wherein the clamping circuit includes at least one diode.

7. The current limiting circuit of claim 1 wherein the control circuit is configured to adjust the amount of current from the power supply to charge the load capacitance.

8. The current limiting circuit of claim 7 wherein the control circuit includes one or more electrical components configured to adjust the amount of current.

9. The current limiting circuit of claim 8 wherein the transistor includes a MOSFET operating in its saturation mode when the one or more electrical components adjust the amount of current from the power supply to charge the load capacitance.

10. The current limiting circuit of claim 8 wherein the one or more electrical components include at least one capacitor and at least one resistor.

11. The current limiting circuit of claim 1 wherein the transistor is a first transistor and wherein the one or more control switching devices includes a second transistor and a third transistor.

12. The current limiting circuit of claim 1 wherein the threshold is based on the one or more control switching devices.

13. The current limiting circuit of claim 1 wherein the defined parameter includes a defined period of time after the transistor turns off and wherein the control circuit is configured to control the transistor to turn on when the defined period of time has elapsed.

14. The current limiting circuit of claim 1 wherein the threshold is a first threshold, wherein the defined parameter includes a second threshold, and wherein the control circuit is configured to control the transistor to turn on when a voltage across the inductor is less than or equal to the second threshold.

15. The current limiting circuit of claim 14 wherein the second threshold is based on the one or more control switching devices.

16. A power supply configured to power a load including a capacitance, the power supply comprising the current limiting circuit of claim 1, the current limiting circuit configured to couple to the load capacitance.

17. The power supply of claim 16 wherein the inductor is at least a portion of an output filter of the power supply.

18. A load configured to couple to a power supply, the load comprising a capacitance and the current limiting circuit of claim 1 coupled to the load capacitance.

19. The load of claim 18 wherein the inductor is at least a portion of an input filter of the load.

20. The load of claim 18 wherein the load capacitance is at least a portion of an input filter.

21. A power supply comprising:
an output for supplying current to a load having a capacitance;
a power converter configured to generate a regulated output voltage; and
a current limiting circuit coupled between the power converter and the output, and configured to control the current to the load, the current limiting circuit including:
an inductor;
a transistor coupled in a current path with the inductor, the transistor having a control terminal; and
a control circuit coupled to the control terminal of the transistor and configured to sense a voltage across the inductor, the control circuit having one or more control switching devices configured to control the transistor including turning off the transistor when the voltage across the inductor is greater than a threshold to restrict current from a power supply, and turning on the transistor when a defined parameter is met to allow current from the power supply to charge the load capacitance.

* * * * *